(12) United States Patent
Takashima

(10) Patent No.: US 10,281,262 B2
(45) Date of Patent: May 7, 2019

(54) RANGE-FINDER APPARATUS, METHODS, AND APPLICATIONS

(71) Applicant: Arizona Board of Regents on Behalf of the University of Arizona, Tucson, AZ (US)

(72) Inventor: Yuzuru Takashima, Cupertino, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 15/756,290

(22) PCT Filed: Aug. 19, 2016

(86) PCT No.: PCT/US2016/047767
§ 371 (c)(1),
(2) Date: Feb. 28, 2018

(87) PCT Pub. No.: WO2017/040066
PCT Pub. Date: Mar. 9, 2017

(65) Prior Publication Data
US 2018/0252513 A1    Sep. 6, 2018

Related U.S. Application Data

(60) Provisional application No. 62/212,525, filed on Aug. 31, 2015.

(51) Int. Cl.
*G01J 3/00* (2006.01)
*G01B 11/14* (2006.01)
(Continued)

(52) U.S. Cl.
CPC .............. *G01B 11/14* (2013.01); *G01B 11/22* (2013.01); *G01C 3/02* (2013.01); *G01S 7/4815* (2013.01);
(Continued)

(58) Field of Classification Search
CPC ...... G01J 3/02; G01J 3/28; G01J 3/42; G01N 21/31; G01N 21/552
(Continued)

(56) References Cited

U.S. PATENT DOCUMENTS 6,388,738 B1    5/2002 Abe
6,515,734 B1    2/2003 Yamada et al.
(Continued)

OTHER PUBLICATIONS

Written Opinion and International Search Report; Application No. PCT/US2016/047767; Form PCT/ISA/237 and PCT/ISA/210; dated Oct. 28, 2016; 9 pages.

*Primary Examiner* — Md M Rahman
(74) *Attorney, Agent, or Firm* — Bond, Schoeneck & King, PLLC; Jeffrey Powers

(57) ABSTRACT

An imaging laser range finder including an objective lens having an optical axis, an object side, and an image side, a controllable pixelated light modulator disposed along the optical axis on the image side of the lens, and a detector disposed optically downstream from the pixelated light modulator on the image side of the lens. The controllable pixelated light modulator is advantageously a MEMS-based system such as a digital mirror device (DMD). An increased field of view may be obtained by incorporating a pair of opposing surface reflectors between an imaging lens and the controllable pixelated light modulator. Associated methods are disclosed.

20 Claims, 10 Drawing Sheets

(51) Int. Cl.
*G01S 17/89* (2006.01)
*G01B 11/22* (2006.01)
*G01S 17/42* (2006.01)
*G01S 17/93* (2006.01)
*G01S 7/481* (2006.01)
*G01C 3/02* (2006.01)

(52) U.S. Cl.
CPC ............ *G01S 7/4817* (2013.01); *G01S 17/42* (2013.01); *G01S 17/89* (2013.01); *G01S 17/936* (2013.01)

(58) Field of Classification Search
USPC ........................................................ 356/300
See application file for complete search history.

(56) References Cited

U.S. PATENT DOCUMENTS

| | | |
|---|---|---|
| 8,531,650 B2 | 9/2013 | Feldkhun et al. |
| 9,689,667 B2 | 6/2017 | Royo Royo et al. |
| 2005/0123239 A1 | 6/2005 | Dho |
| 2009/0141336 A1 | 6/2009 | Bohler |

RANGE-FINDER APPARATUS, METHODS, AND APPLICATIONS

RELATED APPLICATION DATA

The instant application is the United States National Stage entry under 35 U.S.C. 371 of PCT/US2016/047767 filed on Aug. 19, 2016, which in turn claims priority to U.S. provisional application 62/212,525 filed on Aug. 31, 2015, the subject matter of both applications is incorporated by reference herein in their entireties.

BACKGROUND

Aspects and embodiments of the invention are directed to range-finding apparatus, methods, and applications thereof. More particularly, aspects and embodiments are directed to lidar and optical scanning apparatus, methods, and applications and, most particularly to range-finder apparatus having a wide field of view, associated methods, and applications thereof.

Mapping the distance to objects by measuring a time of flight has become one of the main sensing schemes for the purpose of improving the safety of automotive transportation and autonomously driven vehicles. Distances to objects, such as cars, pedestrians, and obstacles may be measured, for example, over a 360 degree field of view with sub one (1) degree resolution and a 10 fps frame rate by launching a nano-second pulse from a laser toward an object. The reflected light from the object is detected by a detector, comprising for example, a silicon photo diode or an avalanche photo diode (APD). The distance between the light source and the object is measured by detecting the delay between the launching of the pulse by the laser and the arrival of the echo at the detector. Such a distance measurement system used along with object recognition can be used to reduce the probability of car accidents.

Also, autonomous driving requires some range finding mechanism such as laser range finding. Laser range finding is also of interest for consumer applications, such as robot cleaners and others. Mapping of objects in a room, for example, by a distance measurement increases the area throughout the room that can be cleaned by providing additional information to the existing routing algorithm.

A new generation of Lidar systems with high resolution, high ranging accurate, and high frame rate is heading toward the direction of miniaturization, light weight, portability, and low cost and has been applied widely in the civilian and military fields such as laser ranging, topography, architectural drawing, environmental monitoring, vehicle driving navigation, unmanned ground vehicle navigation, etc. In Lidar systems, a resonant scanner can be considered one of the important components because of its huge advantages, including fast scanning speed, flexibility, low power consumption, etc. However, the mechanical tilt angle of a resonant scanner with a small aperture of 10 mm×6 mm has a maximum optical full scan angle of only about 50°, which is simply not enough for a Lidar system for autonomous applications.

For automotive applications, a light detection and ranging (lidar) system is currently relatively expensive. For example a Lidar system currently offered by Verodyne has been found to cost about $80,000. The system employs conventional mechanical scanning; that is, both the laser sources and the detectors are mounted on a rotating mechanical mount. Pulsed light from the laser is collimated by a lens and directed toward an object, and an echo of the pulse coming off the object is captured by detector optics and focused on the detector, while the entire optical setup is rotating at a high speed. This mechanical scanning approach is believed to be the most effective mechanical scanning approach currently available. Since the light is collimated, the laser power density at the object is high, thus the reflected signal can be detected with a high signal-to-noise ratio (SNR).

In low cost car and various consumer applications, non-mechanical scanning is ideal to avoid failure of the scanning mechanism carrying the transmitter and the receiver. For this case, a rotating polygon mirror may be used to scan a laser across a scene, or a flood illumination array of laser diodes (LDs) or light emitting diodes (LEDs) can provide non-mechanical scanning. However for receiver optics, there is no viable solution available to map distance and angular position of an object other than low resolution avalanche photo diode (APD) arrays whose resolution is very low compared to the desired specifications of 10 fps, 360 degree FOV, and sub one (1) degree resolution.

Advantages and benefits over the current state of the art as well as solutions to problems associated with current state of the art apparatus and methods, appreciated by those skilled in the art, would be realized by improved range-finding and scanning apparatus and methods as enabled by the embodiments disclosed and claimed herein, particularly by the elimination of bulky mechanical scanning apparatus, increased field of view, and improved resolution of measurement data.

SUMMARY

An aspect of the invention is an optical scanning device. In a non-limiting exemplary embodiment, the scanning device includes an objective lens having an optical axis, a controllable pixelated light modulator disposed along the optical axis on an image side of the objective lens and having a plurality of individual pixel elements and a lateral dimension, wherein a direct field of view of the optical scanning device is set by said lateral dimension, a pair of reflective surfaces disposed in opposed tangential planes on opposite sides of the optical axis between the objective lens and the pixelated light modulator and tilted with respect to a sagittal plane, wherein an extended field of view is set by said pair of reflective surfaces such that a point outside of the direct field of view on an object side of the objective lens is mapped to a respective pixel of the pixelated light modulator, a controller coupled to the pixelated light modulator in a manner to selectively control any of a plurality of selected arrangements of the pixel elements so as to map a point from either the direct field of view or the extended field of view on the object side of the objective lens to a single point on an image side of the objective lens, and a detector disposed so as to produce a signal representative of the intensity of light emitted from one or more points in front of the objective lens as the controller selectively controls the pixelated light modulator. In various non-limiting, exemplary embodiments the optical scanning device may include some or all of the following features, components, steps, limitations, and/or characteristics, alone or in non-limiting variations appreciated by those skilled in the art:
  wherein the pair of lateral reflective surfaces have respective substantially-flat reflective surfaces that are disposed substantially parallel to one another;
  wherein each one of the pair of lateral reflective surfaces are tilted from between zero to 10 degrees;
  wherein the controllable pixelated light modulator is a digital micromirror device (DMD);

wherein the controllable pixelated light modulator is a liquid crystal display (LCD);

wherein the controllable pixelated light modulator is a grating light valve (GLV);

further comprising a one dimensional focusing element disposed so as to focus tangential rays reflected from the pixelated light modulator;

wherein the one dimensional focusing element is a cylindrical lens;

further comprising an array of roof mirrors disposed between the pixelated light modulator and the detector, wherein sagittal light rays from the pixelated light modulator are guided to the detector;

further comprising an optical path selector disposed between the objective lens and the micro-mirror array to map individual micro-mirrors both to a corresponding point in front of the objective lens and to the single point in back of the objective lens;

wherein the optical path selector is a beam splitter;

wherein the optical path selector is a frustrated total internal reflection prism;

further comprising a scanner illumination source modulator adapted to modulate the scanner illumination and a demodulator coupled to the detector to demodulate the light directed to the detector by the pixelated light modulator wherein a transit delay of a modulation envelope from the illumination source to the detector can be used to determine a distance of the scanning device from an illuminated object.

An aspect of the invention is a laser range finder. In a non-limiting exemplary embodiment, the laser range finder includes an objective lens having an optical axis, an object side, and an image side, a controllable pixelated light modulator disposed along the optical axis on the image side of the lens, and a detector disposed optically downstream from the pixelated light modulator on the image side of the lens. In various non-limiting, exemplary embodiments the optical scanning device may include some or all of the following features, components, steps, limitations, and/or characteristics, alone or in non-limiting variations appreciated by those skilled in the art:

wherein the pixelated light modulator has a lateral dimension that determines a direct object side field of view (FOV) of the laser range finder;

further comprising a pair of reflective surfaces disposed in opposed tangential planes on opposite sides of the optical axis between the objective lens and the pixelated light modulator and tilted with respect to a sagittal plane, wherein at least one of a shape, a position, an orientation, and a dimension of which establish an indirect FOV of the laser range finder;

wherein the controllable pixelated light modulator is a digital micromirror device (DMD);

wherein the controllable pixelated light modulator is a liquid crystal display (LCD);

wherein the controllable pixelated light modulator is a grating light valve (GLV).

An aspect of the invention is an optical scanning method. In a non-limiting exemplary embodiment, the optical scanning method includes the steps of providing a controllable pixelated light modulator having a plurality of individual pixel elements and a lateral dimension that determines a direct object side scanning field, providing a pair of reflective surfaces disposed in opposed tangential planes on opposite sides of the optical axis between the objective lens and the pixelated light modulator and tilted in a sagittal plane, imaging light from one or more points in the object side scanning field onto the pixelated light modulator by reflection from the pair of reflective surfaces, the shape, position and dimensions of which establish an indirect scanning field, and selectively controlling any of a plurality of selected arrangements of the pixel elements so as to map one or more points in the direct scanning field and the indirect scanning field to a single point in an image side a detection field. In various non-limiting, exemplary embodiments the optical scanning method may include some or all of the following steps, features, components, limitations, and/or characteristics, alone or in non-limiting variations appreciated by those skilled in the art:

further comprising illuminating the one or more points in the object side of the objective lens with light so as to cause light to be emitted from those points and received at the single point on the image side of the objective lens;

further comprising modulating the illuminating light, demodulating the light received at the single point on the image side of the objective lens, and determining a transit delay of the modulation envelope from the source of light to a detector to determine the distance of the scanning device to one or more of the points in the object side of the objective lens.

DETAILED DESCRIPTION OF EXEMPLARY, NON-LIMITING EMBODIMENTS OF THE INVENTION

Figure 1A:
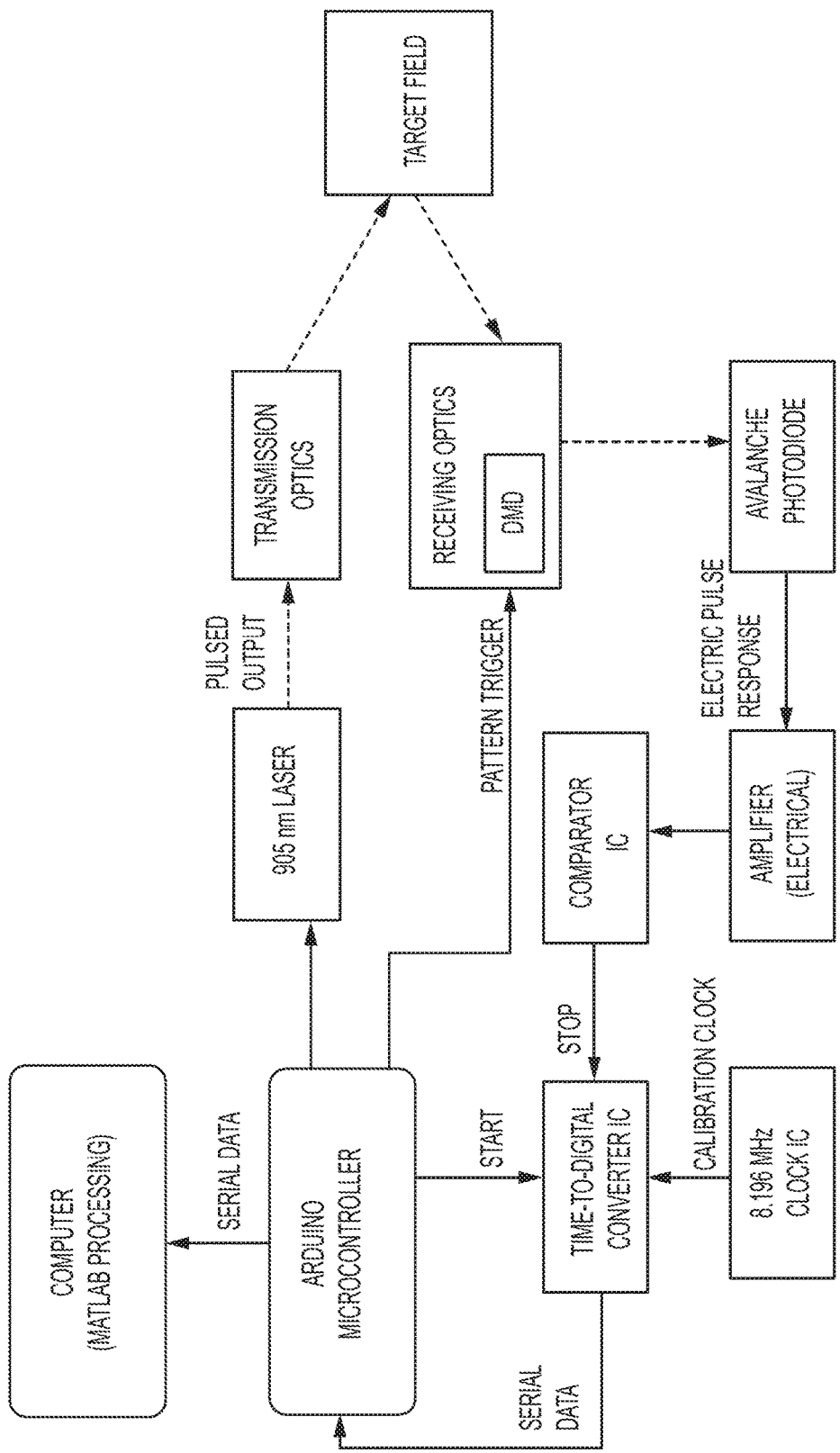
FIG. 1A is a schematic block circuit layout of a pixelated light modulator (e.g., DMD, LCD, GLV (grating light valve)-based imaging Lidar system.
Figure 1B:
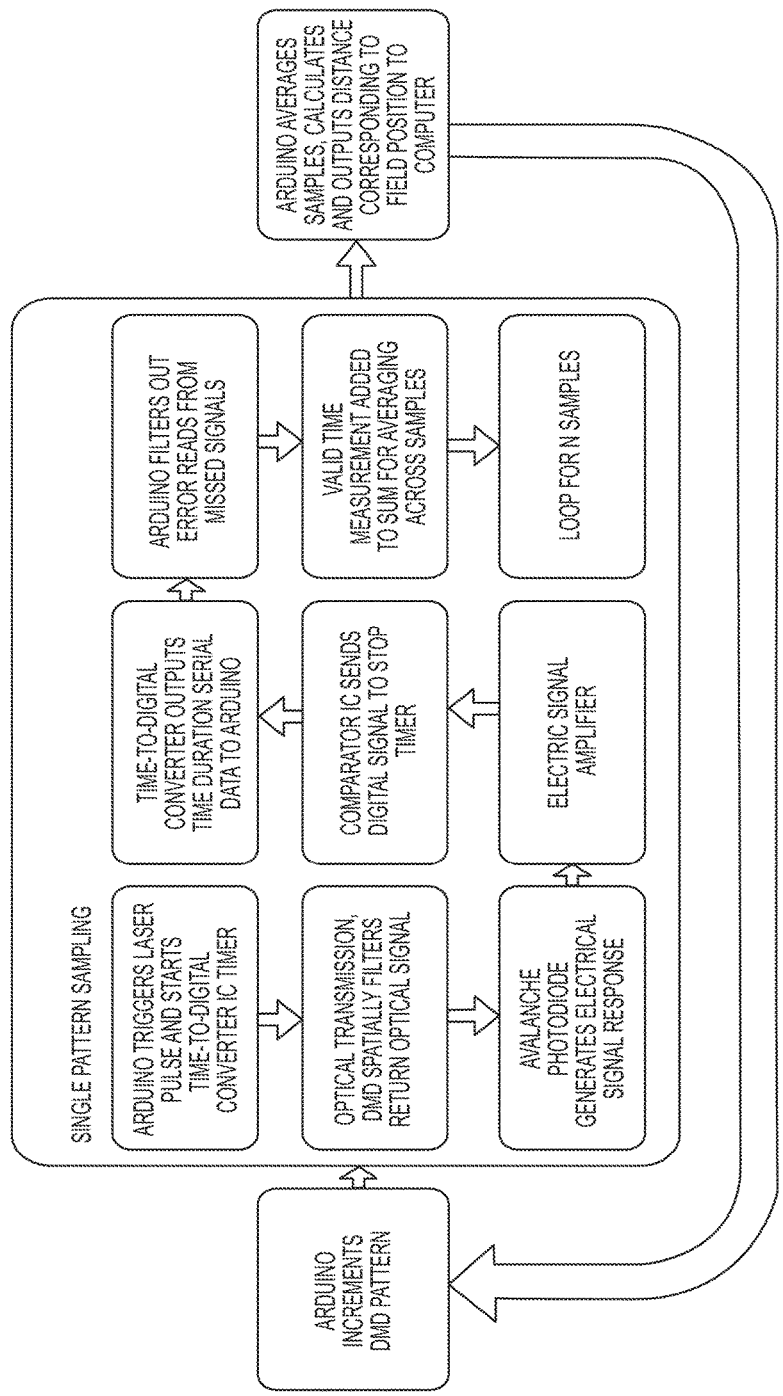
FIG. 1B is a schematic block circuit procedure of operation of a pixelated light modulator-based imaging Lidar system, according to illustrative embodiments of the invention.

FIG. 1A is a schematic block circuit layout of a pixelated light modulator (e.g., DMD, LCD, GLV (grating light valve)-based imaging Lidar system. FIG. 1B is a schematic block circuit procedure of operation of a pixelated light modulator-based imaging Lidar system. As an advantageous embodiment utilizes a digital micromirror device (DMD) as the enabling pixelated light modulator, the term DMD will be used hereinafter in describing all embodiments as a matter of convenience.

For each distance sampling, the microcontroller (e.g., Arduino) triggers a 905 nm laser pulse and also starts a timer in the Time-to-Digital Converter (TDC) Integrated Circuit (IC). The laser pulse is propagated through the transmission optics, reflected by the target field, spatially filtered by the DMD, and captured by an avalanche photodiode (APD). The APD emits a short (20 ns, 100 mV) electrical pulse which is then amplified by an electrical signal amplifier. A comparator IC recognizes the pulse and sends a digital signal (3 V) to the TDC to stop the timer. The TDC uses an 8.196 MHz clock to calibrate each measurement. The TDC sends the serial data of the differential time, in nanoseconds, between the start and stop digital signals to the microcontroller, which filters out the error reads, averages multiple time measurements, and calculates the distance to the target at that particular field position. The microcontroller then increments the DMD pattern to test a new field location before restarting the distance measurements.

The embodied invention enables high resolution, wide FOV, non-mechanical scanning of receiver optics by using microelectromechanical (MEMS)-based optical devices such as a DMD.

Figure 2A:
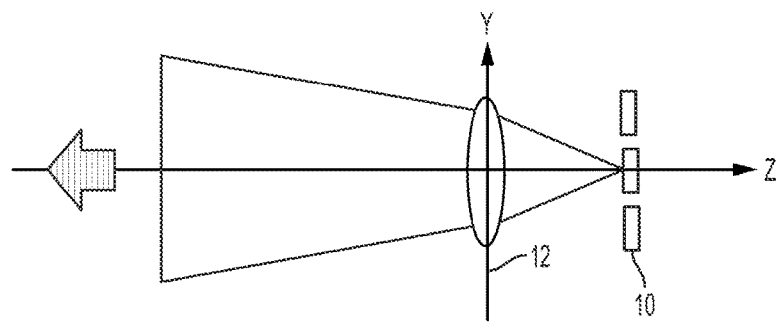
FIG. 2A is a schematic side-view line drawing of a Lidar transmitter portion.
Figure 2B:
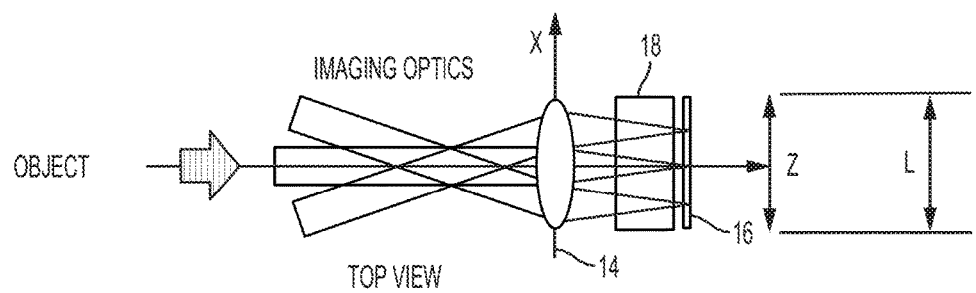
FIG. 2B is a schematic top view line drawing of a DMD-based Lidar receiver portion.
Figure 2C:
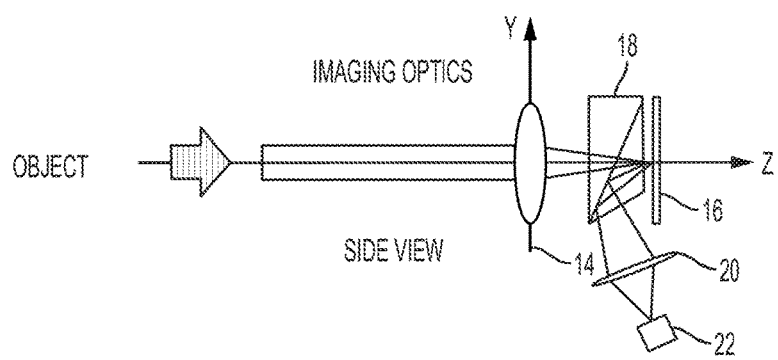
FIG. 2C is a schematic side view line drawing of a DMD-based Lidar receiver portion, according to illustrative embodiments of the invention.

Schematic ray diagrams are shown in FIGS. 2 A, B, and C. FIG. 2A illustrates a LIDAR transmitter portion of the system. Pulsed and/or modulated laser- or LED-sourced light is emitted by a scanning laser device such as conventional rotating polygon mirror or, alternatively as shown, by an array of laser diodes (LDs) or light emitting diodes (LEDs) 10, which provide non-mechanical illumination of an object or target scene. The target field is flood illuminated or partially flood illuminated by the array of light sources. A scanning lens 12 causes the beam to be collimated or slightly diverging to cover the field of view of the receiving optics.

As illustrated in FIGS. 2B (top view) and 2C (side view), a receiving portion comprises an imaging lens 14, a DMD 16, a beam splitter, such as a frustrated total internal reflection (FTIR) prism 18, detection optics 20, and photo detector 22. The entire field of view (FOV) from the target or object side is imaged by the imaging lens 14. The objects illuminated within the FOV are imaged onto the DMD device 16 by imaging lens 14. The DMD device selectively reflects the light from the illuminated object field towards detection optics 20. For example, a single DMD pixel may be partially actuated while the remaining pixels are all turned off. The deflected beam is routed toward the photo detector 22 by a FTIR prism 18 to minimize loss, or alternatively by a beam splitter. Alternatively, off-axis imaging in the vertical direction may be employed to avoid using a beam splitter or an FTIR prism. Finally, the detection optics 20 delivers light to the photo detector 22.

Given the focal length, f, of the imaging optics, the angular resolution, $\Delta\theta$, in units of radians is given by d/f, where d is the pitch of the DMD device. Typically the pixel pitch, d, is on the order of 5-20 micrometer, whereas the focal length, f, of the imaging lens is on the order of 1-100 mm. Assuming that the pitch d of the DMD pixel is 10 µm, (0.01 mm), $\Delta\theta$ is 1E-2 to 1E-4 radians, which corresponds to 0.573 and 0.00573 degrees, respectively. Therefore, a high resolution scan is possible in the embodied imaging geometry.

The full field of view of the passive LIDAR device is limited by the horizontal (x-z plane) extent, L, of DMD 14 and the focal length, f of the imaging optics and is given by $2\tan^{-1}(L/2f)$ for a well-corrected imaging system. Similar to the conventional imaging optics, there is a trade-off between the angular resolution and full FOV. For example, longer focal length provides a higher angular resolution; however, the full FOV becomes smaller.

Figure 3A:
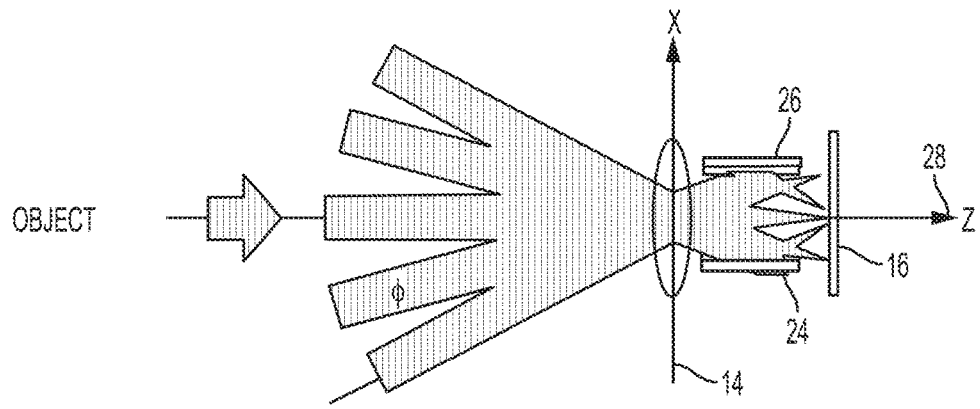
FIG. 3A is a schematic top view of a DMD-based Lidar receiver portion having an increased field-of-view (FOV)
Figure 3B:
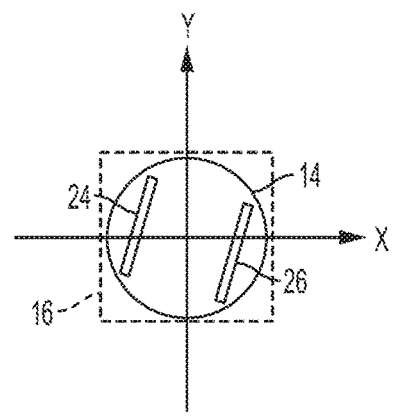
FIG. 3B is a schematic side view seen from positive z-axis of mirror components of the receiver portion shown in FIG. 3A.
Figure 3C:
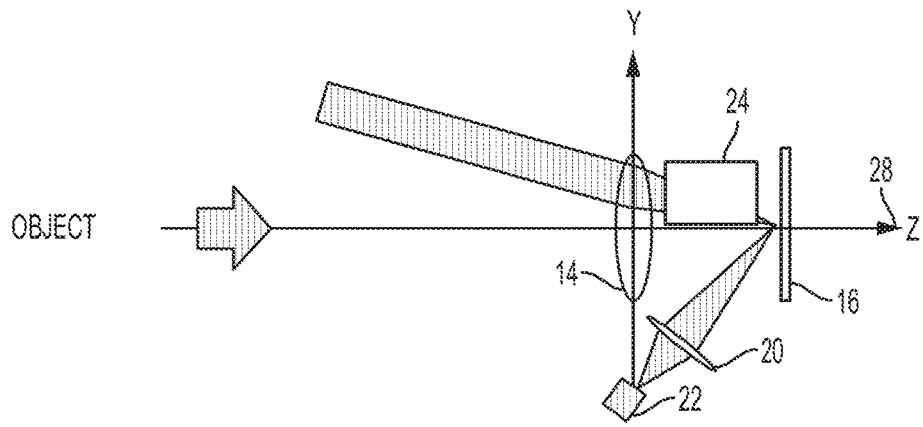
FIG. 3C is a schematic side-view of the receiver portion shown in FIG. 3A, according to illustrative embodiments of the invention.

Referring to FIGS. 3 A, B, and C, this limitation is overcome in the embodied invention by inserting a pair of lateral reflectors, such as mirrors 24 and 26, whose reflecting surfaces are advantageously parallel and facing each other. The pair of reflectors 24, 26 are located along the optical axis 28 of the imaging optics. The respective surface normals of the pair of mirrors are tilted to the horizontal (x-z) scanning (sagittal) plane of the imaging optics between 1-10 degrees. Since the chief ray angle, φ, with respect to the optical axis has to be a finite value, the pair of mirrors remaps the horizontal scanning angle to the DMD plane in a folded and tilted manner. FIG. 3C schematically depicts the effect of the functionality of the pair of mirrors. The implementation is effective especially for Lidar for automotive applications, since the full vertical FOV is relatively small (10-20 degrees) compared to the horizontal FOV (60-180) degrees.

Figure 4A:
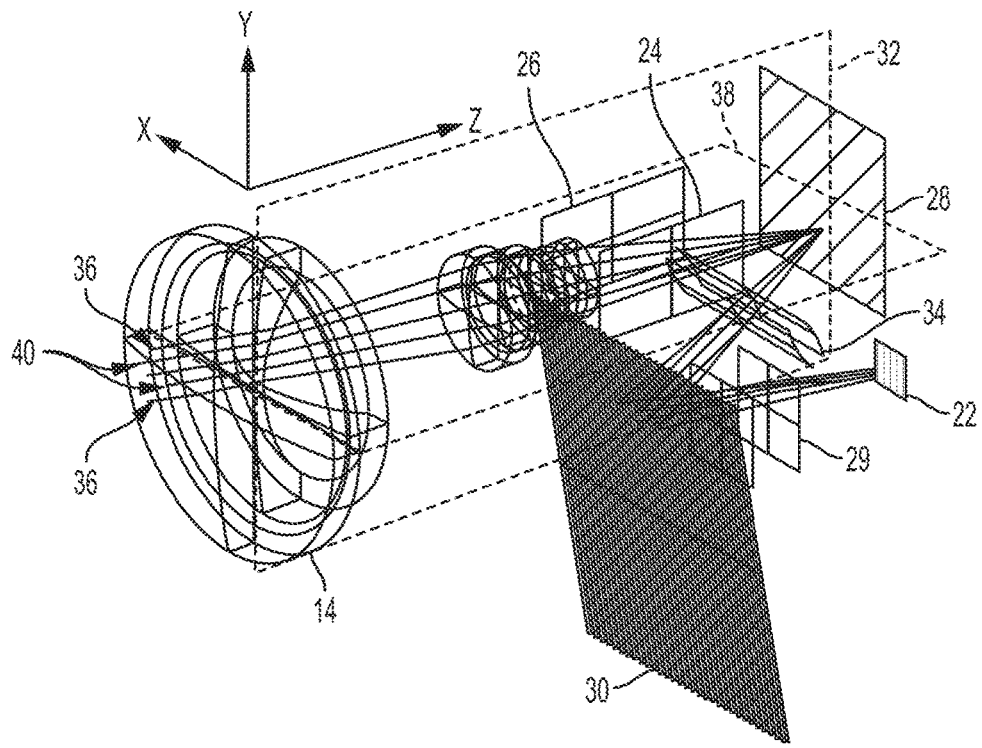
FIG. 4A is a schematic perspective view ray trace diagram illustrating the imaging of the tangential rays by the DMD-based Lidar receiver portion.

FIGS. 4 A and B illustrate the receiver/detection optics portion of the system. As shown, a linear array 30 of retro-reflectors such as, e.g., roof mirrors or roof mirror prisms. An object field/target is imaged by lens 14 on to the DMD 28. The image formed on the DMD is an intermediate image. In the tangential plane 32 the intermediate image is re-imaged onto a photo detector 22 by a cylindrical lens 34 as shown by tangential rays 36 (rays 40 are sagittal rays). As shown in FIG. 4A, the cylindrical lens images the tangential rays from the intermediate image on the DMD to the detector 22 by reflection from one of the roof mirrors.

Figure 4B:
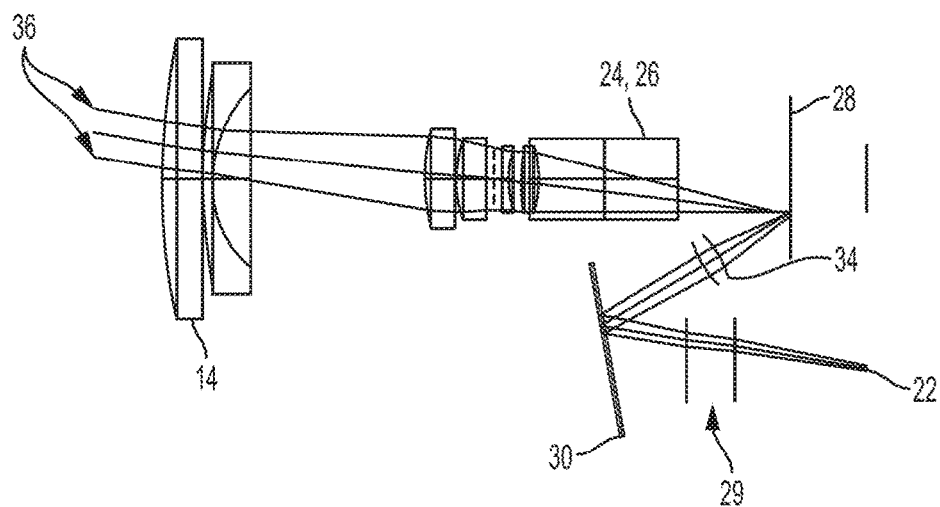
FIG. 4B is a schematic side view of ray trace diagram illustrating the imaging of the tangential rays by the DMD-based Lidar receiver portion, according to illustrative embodiments of the invention.

In the sagittal plane 38, rays 40 are reflected toward and through the cylindrical lens 34 without refraction. As shown in FIG. 4B, the nominal plane of the retroreflector array 30 is oriented with respect to the nominal plane of the DMD 28 and the detector 22 so that the diverging sagittal rays 40 from the DMD are reflected by the retroreflector towards and converge upon the detector 22. The surface normal of the retroreflector array is tilted in the tangential plane so that the final image is displaced with respect to the DMD to accommodate the detector 22. As a result, the intermediate image is re-imaged to detector 22 by two different means for the tangential and sagittal rays, respectively. In this embodiment, the size of detector 22 in the tangential direction is determined by magnification of the cylindrical lens 34. In the sagittal direction, the size of the detector 22 is identical to the lateral dimension of the DMD since the linear roof mirror array 30 has unit magnification. To match the field of view of the detector 22 to the size of the DMD, additional lens units 29 in front of the detector may be inserted when matching the size of the detector to DMD is desired.

As disclosed above, the pair of reflectors 24, 26 located along the optical axis 28 of the imaging optics provide an increased indirect FOV of the system. The structure and operation of the lateral mirrors 24 and 26 for expanding the lateral field of view is further explained with respect to FIGS. 5-8.

Figure 5A:
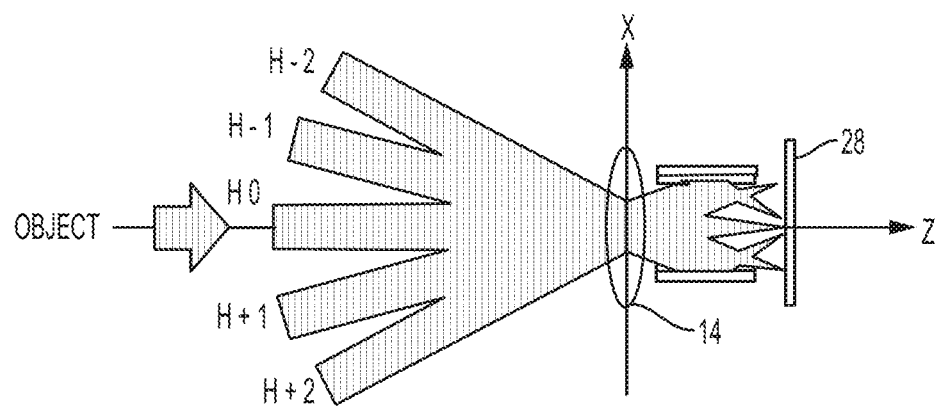
FIG. 5A is a schematic top view of a DMD-based Lidar receiver portion showing representative field points in a horizontal plane.
Figure 5B:
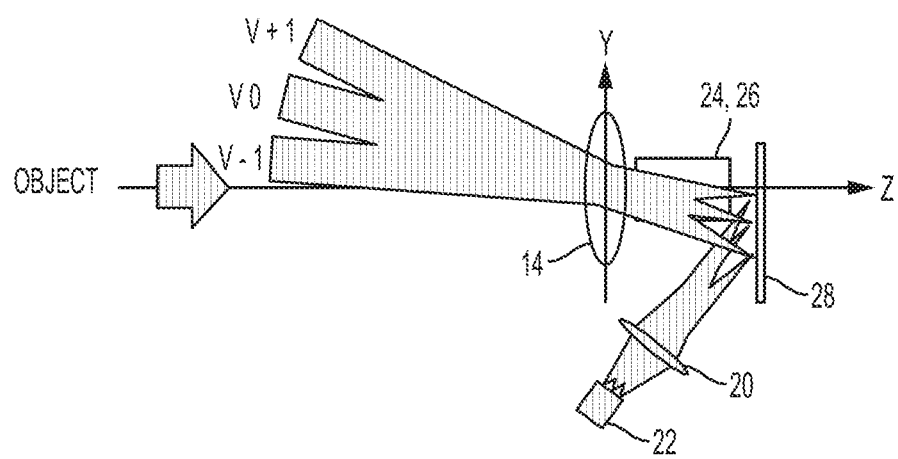
FIG. 5B is a schematic side view of a DMD-based Lidar receiver portion showing representative field points in a vertical plane, according to illustrative embodiments of the invention.
Figure 6A:
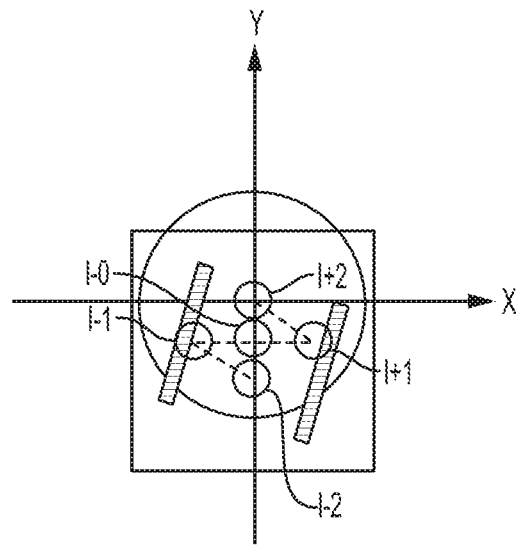
FIG. 6A, FIG. 6B, and FIG. 6C, respectively, diagrammatically illustrate image locations on the DMD for different FOVs, according to illustrative embodiments of the invention.
Figure 6B:
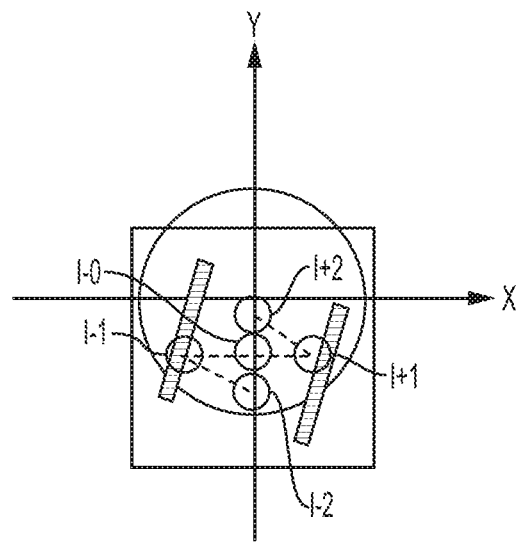
Figure 6C:
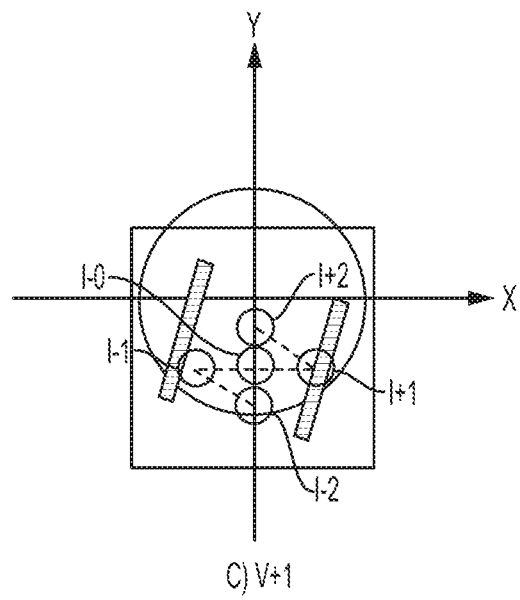
Figure 7:
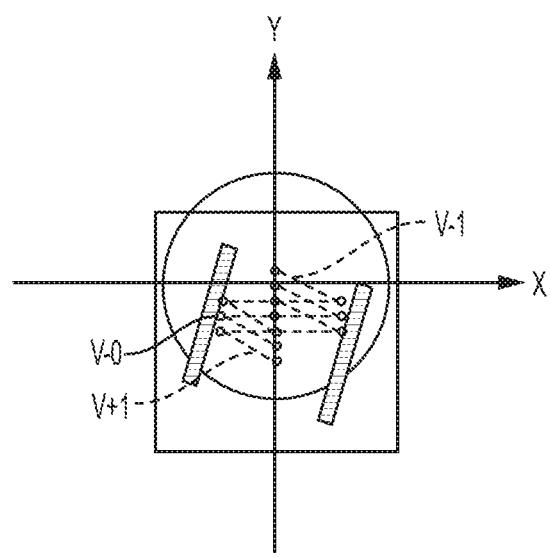
FIG. 7 diagrammatically illustrates overlapping image locations in the DMD plane, according to an illustrative embodiment of the invention.

Referring to FIGS. 5A, 5B, respectively, representative field points in the horizontal (x-z plane) direction (H−2, H−1, H−0, H+1, and H+2) as well as in the vertical (y-z plane) direction (V−1, V−0, V+1) are depicted. In FIGS. 6 (A, B, C), image locations on the DMD are depicted as black circles for each FOV. In FIG. 6B, image locations for H−2, H−1, H−0, H+1, and H+2 with the V−0 vertical field are depicted as image points I−2, I−1, I−0, I+1, I+2, respectively, and similarly for the H_n points for V−1 and V+1 in FIGS. 6A and 6B, respectively. The light captured within the (direct) field of view H−1 to H+1 is not reflected by the parallel mirrors, and goes straight to the DMD. On the other hand, light from an object outside of the H+1 and H−1 field (i.e., extended FOV), which would otherwise miss the DMD, is reflected by the mirrors, and forms image points such as I+2 for H+2 and I−2 for H−2. While increasing the FOV, the trajectory of the image location on the DMD forms a zig-zag line pattern as depicted in FIG. 7. Thus, there is a one-to-one correspondence between the field of view and image location on the DMD device; a line-like object is imaged to a zig-zag pattern. FIGS. 6A, 6B, and 6C depict the trajectory of image locations for vertical fields of view, V−1, V−0, and V+1. The zigzag pattern remains the same as the vertical field of view, whereas mutual shifts along the y-direction among the patterns are induced by the vertical field of view. The zigzag pattern remains the same for V−1, V−0, and V+1, but shifts progressively along the y-direction, such that the individual patterns overlap each other.

The overlapped zigzag patterns effectively fill the DMD plane. However, one-to-one mapping between the object and DMD is not maintained specifically at the points where each of the zig-zag patterns overlap each other, as shown in FIG. 7. One must then distinguish from what vertical FOV (V0, V+1, V−1) the light comes from.

Figure 8A:
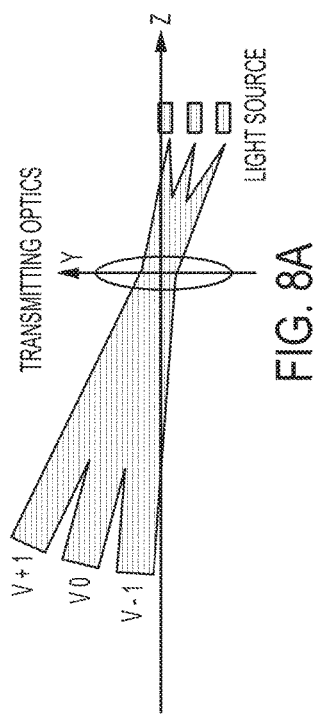
FIG. 8A, FIG. 8B, and FIG. 8C illustrate alternative principles of recovering the one-to-one mapping between horizontal and vertical FOVs to the intermediate image location on the DMD, according to illustrative embodiments of the invention.
Figure 8B:
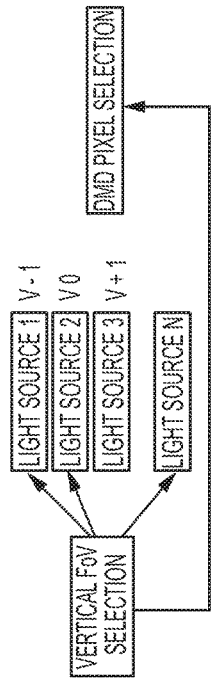

The problem can be solved by using slice illumination and/or applying an orthogonal light modulation code among each vertical field of view. FIGS. 8(A, B, C) show the principle of recovering the one-to-one mapping between horizontal and vertical fields of view to the intermediate image location on the DMD device. The light transmitter consists of an array of light sources. Each light source is a collimated light source scanning a horizontal FOV or a light source collimated in the tangential (vertical) plane and converging or diverging in the sagittal (horizontal) plane. In either implementation, each light source covers only a limited portion of the vertical FOV. Upon scanning the vertical and horizontal fields of view, the transmitter selectively turns on the illuminating light by which the vertical FOV is selected by the transmitter. Upon receiving light, a portion of the DMD mirror is selectively turned on to select the horizontal FOV.

Figure 8C:
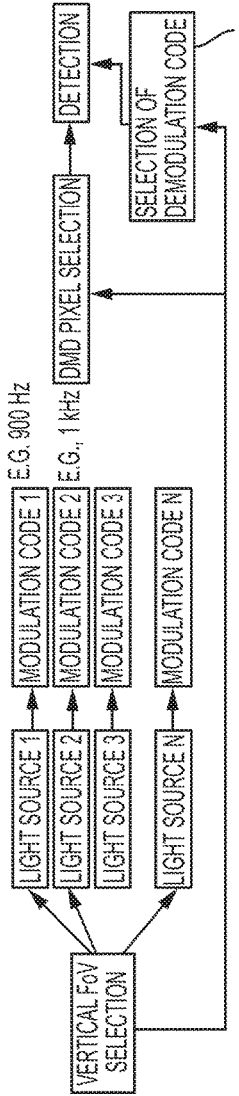

In another implementation shown in FIG. 8C, each of the light transmitters is modulated in an orthogonal manner.

Figure 9:
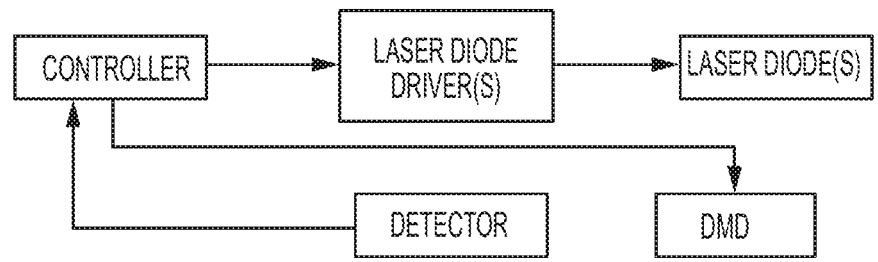
FIG. 9 is a schematic box diagram illustrating control and measurement by a Lidar system, according to an illustrative embodiment of the invention.

Lidar may be implemented by a control and measurement system as shown in FIG. 9. In the case of a diode array scanner, for example, a controller activates the laser diode of the array to select the vertical FOV. The laser diodes are turned on by a timing pulse created by the controller. The wave shape of the resulting laser pulse advantageously is Gaussian for a time-of-flight based distance measurement. Alternatively, a modulated pulse shape may be used. At the same time, the controller drives the DMD to select the horizontal FOV by turning on the corresponding pixel(s). The reflected laser light from an object is detected by the detector. The detected signal is compared with the timing pulse. For time of flight measurement, the delay of the detected pulse with respect to the timing pulse is measured. Alternatively, a correlation operation as a function of delay time measured with respect to the timing pulse is carried out for the modulated pulse shape. The time delay provides distance information for the vertical FOV by selection of the illumination source, and selection of the pixel(s) of the DMD. The horizontal scanning operation is repeated for the full vertical and horizontal FOVs of the system.

I claim:

1. An optical scanning device, comprising:
an objective lens having an optical axis;
a controllable pixelated light modulator having a plurality of individual pixel elements and a lateral dimension, disposed along the optical axis on an image side of the objective lens, wherein a direct field of view of the optical scanning device is set by said lateral dimension;
a pair of reflective surfaces disposed in opposed tangential planes on opposite sides of the optical axis between the objective lens and the pixelated light modulator and tilted with respect to a sagittal plane, such that a wide angle point on an object side of the objective lens is mapped to a respective pixel of the pixelated light modulator;
a controller coupled to the pixelated light modulator in a manner to selectively control any of a plurality of selected arrangements of the pixel elements so as to map the point on the object side of the objective lens to a single point on an image side of the objective lens; and
a detector disposed so as to produce a signal representative of the intensity of light emitted from one or more points in front of the objective lens as the controller selectively controls the pixelated light modulator.

2. The scanning device of claim 1, wherein the pair of lateral reflective surfaces have respective substantially-flat reflective surfaces that are disposed substantially parallel to one another.

3. The scanning device of claim 1, wherein each one of the pair of lateral reflective surfaces are tilted from between zero to 10 degrees.

4. The scanning device of claim 1, wherein the controllable pixelated light modulator is a digital micromirror device (DMD).

5. The scanning device of claim 1, wherein the controllable pixelated light modulator is a liquid crystal display (LCD).

6. The scanning device of claim 1, wherein the controllable pixelated light modulator is a grating light valve (GLV).

7. The optical scanning device of claim 1, further comprising a one dimensional focusing element disposed so as to focus tangential rays reflected from the pixelated light modulator.

8. The optical scanning device of claim 7, wherein the one dimensional focusing element is a cylindrical lens.

9. The optical scanning device of claim 1, further comprising an array of roof mirrors disposed between the pixelated light modulator and the detector, wherein sagittal light rays from the pixelated light modulator are guided to the detector.

10. The optical scanning device of claim 1, further comprising an optical path selector disposed between the objective lens and the micro-mirror array to map individual micro-mirrors both to a corresponding point in front of the objective lens and to the single point in back of the objective lens.

11. The optical scanning device of claim 10, wherein the optical path selector is a beam splitter.

12. The optical scanning device of claim 10, wherein the optical path selector is a frustrated total internal reflection prism.

13. The optical scanning device of claim 1, further comprising a scanner illumination source modulator adapted to modulate the scanner illumination and a demodulator coupled to the detector to demodulate the light directed to the detector by the pixelated light modulator wherein a transit delay of a modulation envelope from the illumination source to the detector can be used to determine a distance of the scanning device from an illuminated object.

14. An optical scanning method, comprising:
providing a controllable pixelated light modulator having a plurality of individual pixel elements and a lateral dimension that determines a direct object side scanning field;
providing a pair of reflective surfaces disposed in opposed tangential planes on opposite sides of the optical axis between the objective lens and the pixelated light modulator and tilted in a sagittal plane;
imaging light from one or more points in the object side scanning field onto the pixelated light modulator by reflection from the pair of reflective surfaces, the shape, position and dimensions of which establish an indirect scanning field; and
selectively controlling any of a plurality of selected arrangements of the pixel elements so as to map one or more points in the direct scanning field and the indirect scanning field to a single point in an image side a detection field.

15. The optical scanning method of claim 14, further comprising illuminating the one or more points in the object side of the objective lens with light so as to cause light to be emitted from those points and received at the single point on the image side of the objective lens.

16. The optical scanning method of claim 15, further comprising modulating the illuminating light, demodulating the light received at the single point on the image side of the objective lens, and determining a transit delay of the modulation envelope from the source of light to a detector to determine the distance of the scanning device to one or more of the points in the object side of the objective lens.

17. A laser range finder, comprising:
an objective lens having an optical axis, an object side, and an image side;
a controllable pixelated light modulator disposed along the optical axis on the image side of the lens, the pixelated light modulator having a lateral dimension that determines a direct object side field of view (FOV) of the laser range finder;
a pair of reflective surfaces disposed in opposed tangential planes on opposite sides of the optical axis between the objective lens and the pixelated light modulator and tilted with respect to a sagittal plane, wherein at least one of a shape, a position, an orientation, and a dimension of which establish an indirect FOV of the laser range finder; and
a detector disposed optically downstream from the pixelated light modulator on the image side of the lens.

18. The scanning device of claim 17, wherein the controllable pixelated light modulator is a digital micromirror device (DMD).

19. The scanning device of claim 17, wherein the controllable pixelated light modulator is a liquid crystal display (LCD).

20. The scanning device of claim 17, wherein the controllable pixelated light modulator is a grating light valve (GLV).

* * * * *